(12) United States Patent
Williams et al.

(10) Patent No.: US 8,788,440 B2
(45) Date of Patent: Jul. 22, 2014

(54) VERTICAL CURVE SYSTEM FOR SURFACE GRADING

(76) Inventors: Mark Williams, Saranac, MI (US); Alan Williams, Ann Arbor, MI (US)

(*) Notice: Subject to any disclaimer, the term of this patent is extended or adjusted under 35 U.S.C. 154(b) by 117 days.

(21) Appl. No.: 13/373,129

(22) Filed: Nov. 4, 2011

(65) Prior Publication Data

US 2012/0143572 A1 Jun. 7, 2012

Related U.S. Application Data

(63) Continuation of application No. 12/148,310, filed on Apr. 18, 2008, now Pat. No. 8,073,791.

(60) Provisional application No. 60/925,422, filed on Apr. 20, 2007.

(51) Int. Cl.
G06F 15/18 (2006.01)
G06N 3/00 (2006.01)
G06N 3/12 (2006.01)

(52) U.S. Cl.
CPC ........................................ G06N 3/12 (2013.01)
USPC ............................................................ 706/13

(58) Field of Classification Search
USPC ............................................................ 706/13
See application file for complete search history.

(56) References Cited

U.S. PATENT DOCUMENTS

| | | | |
|---|---|---|---|
| 4,402,368 A | 9/1983 | Moberly | |
| 4,807,131 A | 2/1989 | Clegg | |
| 5,275,663 A | 1/1994 | Kim | |
| 5,471,391 A | 11/1995 | Gudat | |
| 5,477,459 A | 12/1995 | Clegg | |
| 5,493,494 A | 2/1996 | Henderson | |
| 5,517,463 A | 5/1996 | Hornbostel | |
| 5,612,864 A | 3/1997 | Henderson | |
| 5,631,658 A | 5/1997 | Gudat | |
| 5,646,844 A | 7/1997 | Gudat | |
| 5,735,352 A | 4/1998 | Henderson | |
| 5,764,511 A | 6/1998 | Henderson | |
| 5,801,967 A | 9/1998 | Henderson | |
| 5,808,907 A | 9/1998 | Shetty | |
| 5,925,085 A | 7/1999 | Kleimenhagen | |
| 5,935,192 A | 8/1999 | Henderson | |
| 6,047,227 A | 4/2000 | Henderson | |
| 6,073,068 A | 6/2000 | Koehrsen | |
| 6,112,143 A | 8/2000 | Allen | |
| 6,434,462 B1 | 8/2002 | Bevly | |
| 6,880,643 B1 | 4/2005 | Zimmerman | |
| 6,996,507 B1 | 2/2006 | Myr | |
| 2002/0162668 A1* | 11/2002 | Carlson et al. | ................. 172/4.5 |
| 2005/0058971 A1* | 3/2005 | Bugosh | ......................... 434/151 |

OTHER PUBLICATIONS

International Preliminary Report on Patentability for PCT/US2008/004988, Form PCT/IB/373 (dated Oct. 20, 2009).

* cited by examiner

*Primary Examiner* — Kakali Chaki
*Assistant Examiner* — Ababacar Seck
(74) *Attorney, Agent, or Firm* — Butzel Long

(57) ABSTRACT

A method is disclosed that generates design profiles and a surface therefrom that promote water drainage from soil in an area of interest. Topographical data describing an initial surface of the area of interest are used to form initial profiles. The method generates the design profiles using the initial profiles and desired design parameters such as minimum slope, maximum slope, optimal slope, maximum depth, optimal depth, starting elevation, ending elevation, rules of curvature, and rules of earth balancing. The method generates design surface profiles so that the cut volumes and fill volumes of the soil are at or near balance as much as possible from the available soil in the area of interest.

19 Claims, 9 Drawing Sheets

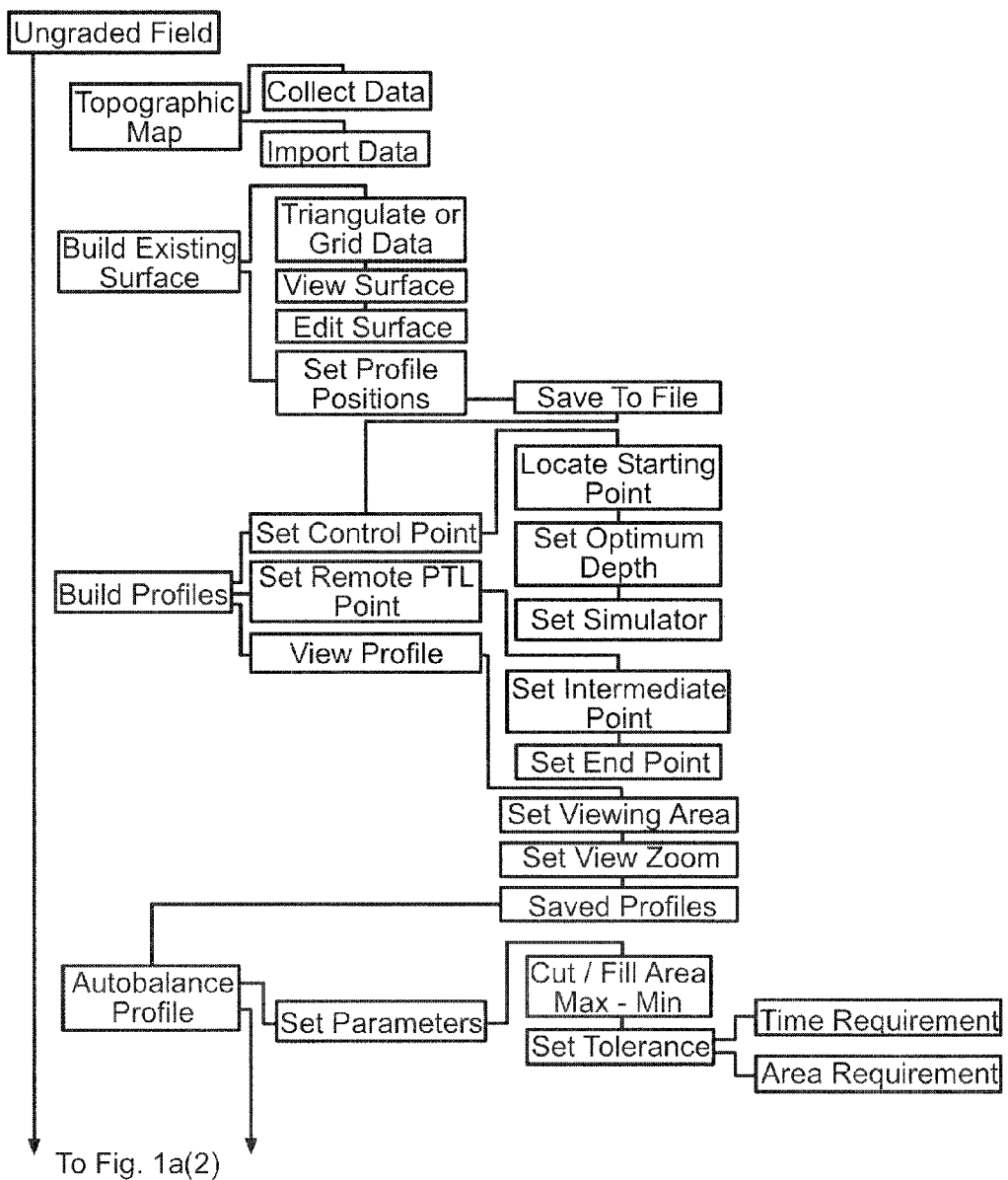
FIG. 1a(1)

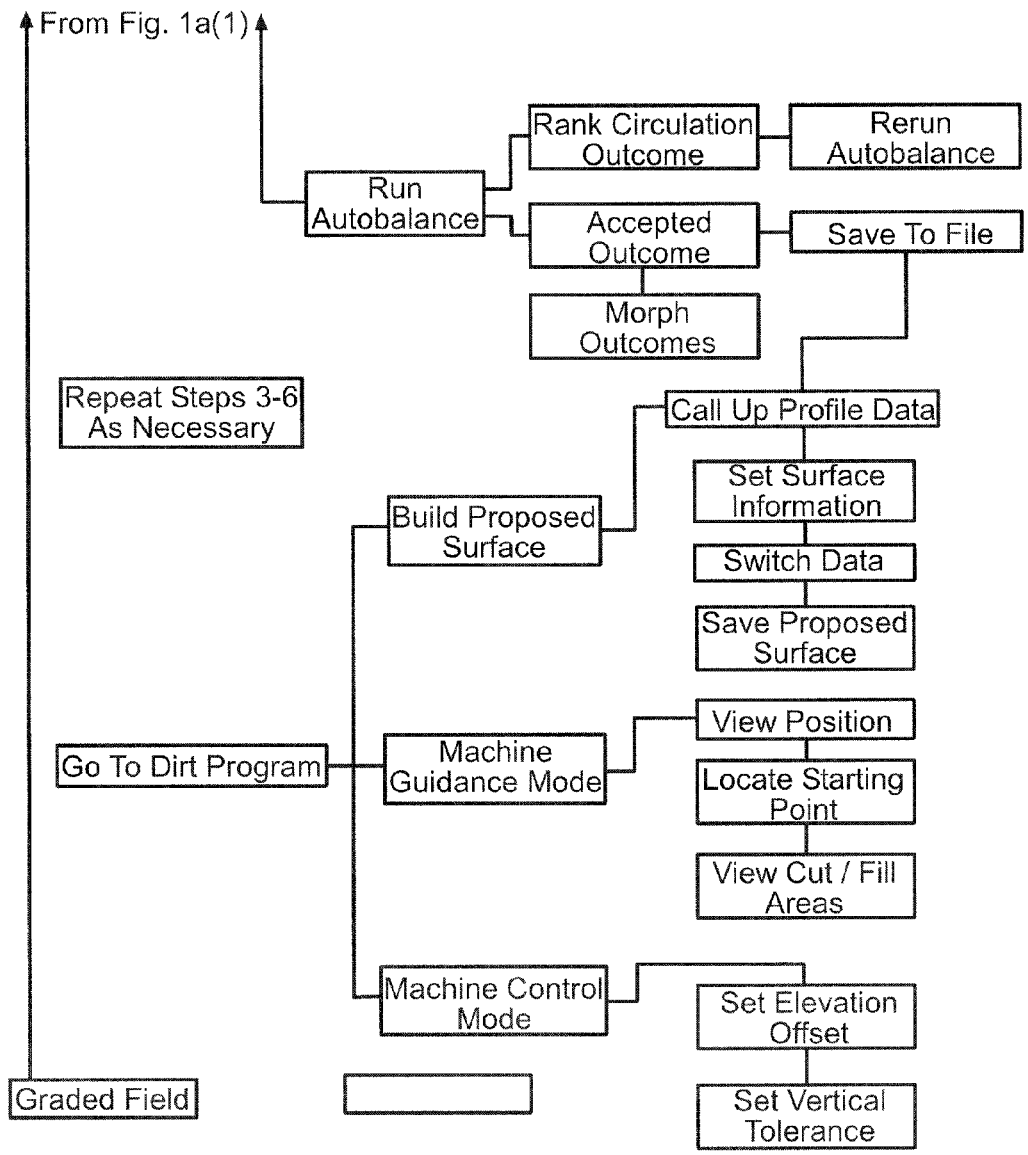
FIG. 1a(2)

VERTICAL CURVE SYSTEM FOR SURFACE GRADING

CROSS-REFERENCE TO RELATED APPLICATION

This application is a continuation of U.S. application Ser. No. 12/148,310, filed Apr. 18, 2008, now U.S. Pat. No. 8,073,791 from which priority is claimed to provisional application No. 60/925,422, filed Apr. 20, 2007, the entire disclosures of which are herein incorporated by reference in their entireties.

BACKGROUND OF THE DISCLOSURE

1. Field of the Disclosure

The disclosure relates to generating a design surface for an area of interest, for example an agricultural field, in which case the design surface promotes water drainage from soil.

2. Brief Description of Related Technology

Existing land-leveling systems are driven by lasers and global positioning satellite systems. These systems generally are automated with the ability to follow a plane of light provided by a rotating laser or a digitally designed plane using a computer and global positioning. Land-leveling is carried out for getting a desired surface and slope of the land. Proper leveling of land is crucial in agricultural farms as it ensures efficient water run-off and proper irrigation. It is also required in various other processes such as laying of railway lines, roads, parking lots and construction of buildings. Land-leveling is performed to create a surface in a field that will allow the flow of water for either irrigation or drainage. It is desirable to control the amount of water available to crops in a way that enough water is present but not enough so that the crop drowns out.

Land-leveling is carried out by cutting and filling of earth in a field to create the surface described by a laser plane or digital surface. It is important to balance the earth cut and fill so that soil or other materials do not have to be imported or exported to meet the design plan. Traditional land-leveling is done by first making relatively crude maps or cut sheets that are mathematically manipulated to achieve an earth balance. The result of these maps or cut sheets are provided to an operator who then sets his laser and machine control system to build the design. The operator can see by the machine control system display whether he needs to cut or fill in a certain area and proceeds to move the earth from high to low areas. During this process, the operator updates his cut sheet to keep track of his process. Newer systems include the ability to digitally perform mapping, design the planar surface and control earth moving and grading processes. They also record the end result as a form of verifying that the work was done properly.

The drawbacks of the aforementioned systems are that they create simple planar or multiple planed surfaces. The surface or surfaces are not smoothly integrated into a design that vertically curves into each other. They depend on an earth balance that only refers to the entire site, not portions of that site. To eliminate the abovementioned drawbacks, various systems based on ultrasound and laser have been proposed. Laser-based systems consist of a swept laser beam that forms a reference laser plane. The laser plane is so adjusted that it aligns itself with the desired terrain. The sensors attached to the blades of the scraper sense the laser plane. This information is displayed to an operator who manually adjusts the height of the implement within an acceptable tolerance range. An example of one such system is U.S. Pat. No. 4,807,131 to Clegg. Clegg teaches a system that measures the elevation of the grading blade relative to the laser plane and displays parameters such as target elevation, actual elevation and an allowable tolerance range to the operator. This enables the operator to adjust the position of the blades within the acceptable tolerance range.

However, laser-based systems suffer from a number of drawbacks. First, laser-based systems have a limited range because of the curvature of the earth, light-incoherence and temperature dependencies of the equipment. The typical range of a laser-based system is less than three thousand feet, which is very small when compared to the average size of agricultural farms. Second, laser-based systems don't provide any direct measure of accuracy and integrity of the system. Third, laser-based systems cannot be used continuously for several reasons. Fourth, wind affects the accuracy of a laser system. As these systems do not provide the horizontal position, the operator requires visible reference markers to guide the vehicle over a field. Therefore, these systems cannot be used when the visibility is low, for example at night or on a foggy day, due to the lack of markers and the blockage of the laser beam due to dust and/or fog. Due to this, an operator cannot use these systems round-the-clock. Fourth, only two-dimensional planar profiles can be achieved using laser-based systems. It is not possible to achieve curved or three-dimensional profiles.

Curved profiles are critical for proper irrigation in farm fields since the water follows the earth's geoidal shape rather than a flat planar surface. The Global Positioning System is known to provide accurate and reliable position information. Various systems based on GPS are available for carrying out farming operations like seeding, cultivating, planting and harvesting. These systems use the position information of the work implement, derived from GPS data, and the information relating to the desired topography of the field to calculate the desired position of the work implement. However, none of these systems deal with land-leveling using the Global Positioning System.

U.S. Pat. No. 5,493,494 to Henderson teaches a method and apparatus for operating compacting machinery to compact material to a desired degree of compaction. U.S. Pat. No. 5,801,967 to Henderson et al. teaches a method for calculating a volume between a previous and a current site surface for balancing. U.S. Pat. No. 6,434,462 to Bevly et al. discloses a system that controls the tractor along with the implement connected to the tractor. A central processor controls the tractor steering actuator and the implement driving actuator. Another such GPS-based system is disclosed in U.S. Pat. No. 5,764,511 to Henderson. Henderson teaches a system and method for automatically controlling the position of a work implement, which is movably connected to the vehicle. This system maintains the work implement at a pre-selected slope of cut relative to a geographic surface. Autofarm, a part of Novariant, has a system that is mainly used to do tractor steering. This system has been modified to do planar landleveling.

Though the abovementioned patents provide systems that control a tractor and an attached implement, they do not provide specific methods and modes of operation as described herein for efficient and highly accurate land-leveling. From all the abovementioned systems and patents, it is apparent that there is a need for an efficient and around-the-clock land-leveling system that can achieve three-dimensional land profiles and that has a long range and can operate in different modalities depending on the requirements of the site to be leveled. There is a need for a system that optimizes the balance of surface cut volume and fill volume of soil from the area.

SUMMARY

An embodiment of the disclosure includes a method of generating a design surface that promotes water drainage from soil in an area of interest. The method generally includes: (a) acquiring topographic data for an initial surface in an area of interest; (b) providing the topographic data and a set of initial profile design parameters to a means for defining initial profiles; (c) calculating a plurality of initial profiles adhering to the initial profile design parameters; (d) providing the plurality of initial profiles and a set of balancing design parameters to a means for optimizing a cut/fill volume balance; (e) generating a plurality of design profiles with the means for optimizing a cut/fill volume balance, wherein the plurality of design profiles is substantially at balance; and, (f) generating a design surface from the plurality of design profiles. The method can further include (g) directing one or more earth-moving machines to create the design surface in the area of interest. Preferably, at least one of steps (a)-(f) is performed in the field in the area of interest.

An additional embodiment of the disclosure includes a method of generating a design surface that promotes water drainage from soil in an area of interest. The method generally includes: (a) acquiring topographic data for an initial surface in an area of interest; (b) calculating a plurality of initial profiles based on the topographic data and a set of initial profile design parameters; (c) generating a plurality of design profiles from the plurality of initial profiles and a set of balancing design parameters by optimizing a cut/fill volume balance, wherein the plurality of design profiles is substantially at balance; (d) generating a design surface from the plurality of design profiles; and, (e) directing one or more earth-moving machines to create the design surface in the area of interest.

Both of the foregoing embodiments can generally be applied in a multiple-step balancing and optimization process. In the process, the plurality of initial profiles includes both a plurality of first initial profiles and a plurality of second initial profiles. The second initial profiles are generally oriented in a direction different from that of the first initial profiles and intersect the first initial profiles. The first initial profiles and the second initial profiles can be substantially perpendicular at their intersection. The step of generating design profiles is further divided into the additional steps of: (1) generating a plurality of intermediate profiles by optimizing a cut/fill volume balance along the length of the first initial profiles, wherein the plurality of intermediate profiles is substantially at balance; (2) generating an intermediate surface from the plurality of intermediate profiles; and, (3) generating the plurality of design profiles relative to the intermediate surface by optimizing a cut/fill volume balance along the length of the second initial profiles, wherein the plurality of design profiles is substantially at balance.

Any of the foregoing embodiments can include optional features. For example, the means for optimizing a cut/fill volume balance can include a microprocessor executing a genetic algorithm, and the means for defining initial profiles also can include the same or different microprocessor. The initial surface and the design surface can be represented with a triangulated network. Preferably, the set of balancing design parameters include one or more of a minimum profile slope (preferred), a maximum profile slope, an optimal profile slope, a maximum profile depth (preferred), an optimal profile depth (preferred), a starting profile elevation, an ending profile elevation, a profile curvature limit, and an earth balancing limit (preferred; for example with a limit of about 0.1 or less). The resulting design profiles are preferably curved vertically. The initial profiles can additionally be defined based on previously existing design data (e.g., tiling data or ditching data).

It is an object of the disclosure to provide a method of generating a design surface that promotes water drainage from soil in an area of interest.

Another object of the disclosure is to provide a method of generating a design surface that optimizes the balance of surface cut volume and fill volume of soil from the area of interest, both in terms of the material balance and minimization of the cut and fill volumes.

These and other objects of the disclosure will become increasingly apparent with reference to the following drawings and disclosed embodiments.

Additional features of the disclosure may become apparent to those skilled in the art from a review of the following detailed description, taken in conjunction with the drawings, examples, and appended claims.

BRIEF DESCRIPTION OF THE DRAWINGS

For a more complete understanding of the disclosure, reference should be made to the following detailed description and accompanying drawings wherein:

FIG. 1a schematically illustrates a flowchart of the various steps and inputs for generating a design surface according to the disclosure.

FIG. 2b illustrates an initial and a design profile for the area of interest in FIG. 2a.

Figure 1B:
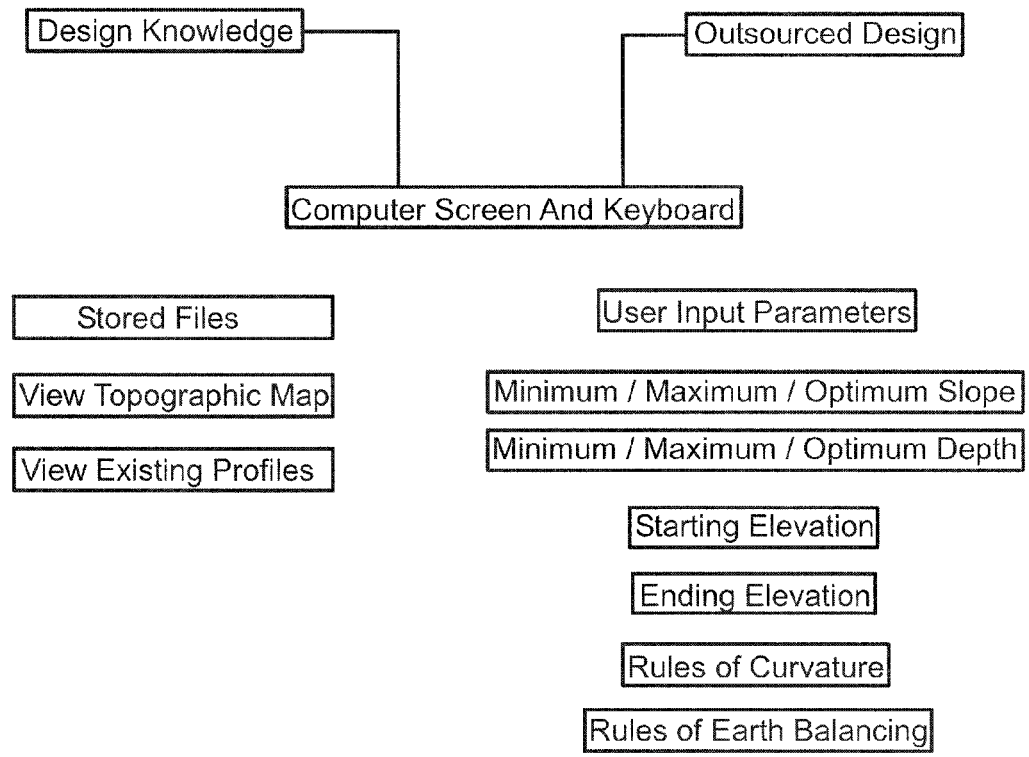
FIG. 1b schematically illustrates various inputs, such as design parameters, for the design surface. Knowledge about the specific area of interest and a specific existing design or desired design to be constructed for the area can be considered when designing the surface.

While the disclosed methods are susceptible of embodiments in various forms, specific embodiments of the disclosure are illustrated in the drawings (and will hereafter be described) with the understanding that the disclosure is intended to be illustrative, and is not intended to limit the claims to the specific embodiments described and illustrated herein.

DETAILED DESCRIPTION

All patents, patent applications, government publications, government regulations, and literature references cited in this specification are hereby incorporated herein by reference in their entirety. In case of conflict, the present description, including definitions, will control.

The term "area of interest" as used herein relates to any region that is to be developed by some form of surface modification. Examples include, but are not limited to, land that is to be used for farming or a region that is to be developed for residential or commercial use. Farmland, parking lots, roads are some examples of areas of interest. As applied to farmland, an area of interest generally includes a field that is to be shaped/graded to promote the flow of surface water off the field (e.g., to a drain, ditch). Similarly, the method can be applied to the design of a parking lot in which the area of interest is generally flat, but which also can promote water run-off (e.g., to a drain).

The term "initial surface" as used herein refers to a starting, generally unmodified topological surface of the area of interest.

The term "design surface" as used herein refers to a final, desired surface relative to the initial surface. The design surface can be designed, for example, to promote water drainage from an area of interest.

The term "cut volume" as used herein refers to the volume of soil or other material which is removed relative to the initial surface to create the design surface. The term "fill volume" as used herein refers to the volume of soil or other material which is added relative to the initial surface to create the design surface. Preferably, the cut volume material is redistributed within the area of interest to occupy the fill volume.

The term "balance" as used herein refers to the minimization of the difference between the cut volume and the fill volume of the soil or other matter moved when creating the design surface from the initial surface in the area of interest. Preferably the difference is substantially equal to zero, or balanced, for an area of interest (i.e., indicating that amount of material removed from the cut volume(s) is redistributed to the areas where material is added to the fill volume(s) with substantially no excess or shortfall. Optimizing the balance minimizes the amount of soil or other material that has to be imported to the area of interest, or removed from the area of interest. The balancing of the disclosure is typically regional, in relation to the area described by a given profile, rather than balancing the whole field area (i.e., the material balance is locally optimized along each profile individually).

The term "profile" or ("topographic profile") as used herein refers to a cross sectional view of a line drawn through a portion of a topographic map. A profile is distinct from a "surface" in that a surface extends in two dimensions and has an elevation component, while a profile represents the elevation of a surface along a particular path through the surface. A profile can be described by a single line or multiple interconnected lines and/or curves. Different points along the profile are associated with an elevation or height of the topographical surface. An initial profile describes a portion of the initial surface (i.e., prior to surface modification, for example by earth moving), while a design profile describes a portion of the design surface (i.e., a proposed or desired result of surface modification). In an embodiment, a profile is used to describe a path along which one would like water to flow across the surface of a field.

The term "genetic algorithm" as used herein refers to the method of obtaining the true or approximate solution to an optimization problem. Genetic algorithms and their implementation are generally known in the art; they use an initial population of candidate solutions and then breed new generations by means of crossover and mutation operations so as to obtain the new generations. A portion of each generation is selected to breed the next generation. The cycle is repeated for a desired number of generations.

The term "means for defining initial profiles" as used herein refers to a program for a computer or similar device capable of generating surface profiles based on topographical data.

The term "means for optimizing balance of surface cut volume and fill volume" as used herein refers to a program for a computer or similar device capable of generating exact or approximate solutions for a design surface that are at or near to balance of the cut and fill volumes. A genetic algorithm can be used to perform the optimization.

The term "design parameters" as used herein refers to parameters for characterizing and/or determining both the initial surface/profiles and the design surface/profiles. Design parameters can include data that define the position and shape of profiles in the area of interest (e.g., beginning point, ending point, and any desired intermediate points to define the location of each profile along with its curvature or approximate curvature). Additional design parameters for determining the design surface/profiles can include profile slope (e.g., minimum, maximum, and optimal), profile depth (e.g., minimum, maximum, and optimal), profile elevation (beginning, ending, intermediate), profile curvature (e.g., maximum), earth balancing (e.g., maximum); and/or material shrink/swell.

Generally, the disclosure provides a land shaping or surface drainage design method that uses a three dimensional measuring instrument to gather topographical data, and then constructs a proposed design surface in an area of interest. The method can utilize a system that includes a computer to store and process topographic data into an initial surface and profiles based on initial design parameters. The software of the computer uses parameter-driven engineering principles along with a set of balancing design parameters to optimize the balance between cut and fill volumes to generate a plurality of design profiles (and a design surface defined thereby). Software can then be used to directly control an earthmoving machine, grading machine, or an existing valve controller to convert the initial surface to the design surface via surface modification.

An agricultural field that is in need of land shaping, as determined by a collected contour map (or by other means, e.g., prior knowledge), is one example of an area of interest for surface designing. The area of interest typically is to be drained to an existing outlet. While some embodiments of the disclosure are directed toward surface drainage of the field, some embodiments relate to drains, such as pipes or ditches. The drains (e.g., characterized by minimum, maximum and optimum slope and depth) can be straight in nature or curved to work with the contour of the existing surface. Working contrary to the goal of surface drainage, the existing field can have problems characterized by changes or rates of change of elevation that are either too large or too small (e.g., the field can be naturally too steep and/or too flat in different regions of the field) and/or characterized by local elevational minima that can trap water in a central depression. Existing earth moving or grading vehicles can be used to cut, fill, and/or move soil on the existing surface and to grade the field surface according to a proposed field design surface. The existing or initial profiles are analyzed to determine where high and low areas exist along the profiles. Design software then applies various design parameters to generate proposed design profiles. Areas of cut and areas of fill are optimized by the system, so as to be at or near to balance and preferably also to minimize net cut and fill. A software user (e.g., an engineer in an office working on a computer with topographical data and/or an operator in a field environment working with a mobile computer and topographical data) can adjust the design parameters or accept the proposal, thus creating a final design profile along a given path. This process is continued until enough profiles are created to represent the proposed design surface. Then the user can direct the software to build a triangulated irregular network (TIN) which describes the design surface based on the design profiles.

An equipment operator can then load the design data into a field computer with software and traverses the field with the earthmoving or grading machinery. As the machinery moves over the surface of the area of interest, the operator sees where the cuts, fills, and transitions therebetween are located. The operator excavates cut volumes from the initial surface and moves earth/soil to adjacent low areas/fill volumes in the field. The operator can use the system as a guidance tool until the surface reaches a point where automated grading becomes useful, more economical, and efficient. At that point, the computer software is able to issue commands to the solenoid valves controlling the elevation of the machine. As the machine is cutting and filling, the software can record the new surface elevations. As the work nears completion, the operator monitors his progress, for example by visualizing the relative progress recorded on the computer.

Topographic Data

Thus, the disclosure provides a method of generating a design surface (i.e., including multiple profiles) that promotes water drainage from soil or other material in an area of interest. As a first step, topographic data are acquired for an initial surface (i.e., a pre-existing, ungraded surface) of the area of interest, as illustrated schematically in FIG. 1a. The topographic data includes a collection of spatial elevation data points distributed throughout the area of interest, which data points describe the shape and elevation of the area of interest. The topographic data can be referenced and/or determined from any of a variety of common sources. However, the topographic data are preferably acquired by an operator traversing the surface of the area of interest (e.g., in a vehicle such as a tractor) while recording the area coordinates and elevation of various points in the field. A measuring device, or combination of devices (e.g., a global positioning system (GPS) device, a robotic total stations surveying device, a laser and GPS combination device, inertial systems, etc.) can be used to record elevation and position as the operator travels across the surface of the area of interest. A computer and software are used to collect and store the topographic data. The data can be viewed in the field or stored for subsequent post-process viewing in an office setting. A person skilled in surface drainage or land shaping can use this information to see how the existing contours of the land would be preferably shaped to promote the controlled runoff of surface water.

The topographic data are used to create a topographic map of the existing initial surface. The topographic data points can be used to create the topographic map via triangulation or via grid formation, which map represents the initial surface of the area of interest. Preferably, the topographic map is constructed by forming a triangular irregular network (TIN) according to the Delaunay method (Delaunay, *Sur la sphère vide*, Izvestia Akademii Nauk SSSR, Otdelenie Matematicheskikh i Estestvennykh Nauk, 7:793-800, 1934). The TIN method designs and integrates triangles that represent a contoured surface between irregularly spaced topographic data points. The TIN method has rules of shaping the triangles that optimally represent the initial surface.

Figure 2A:
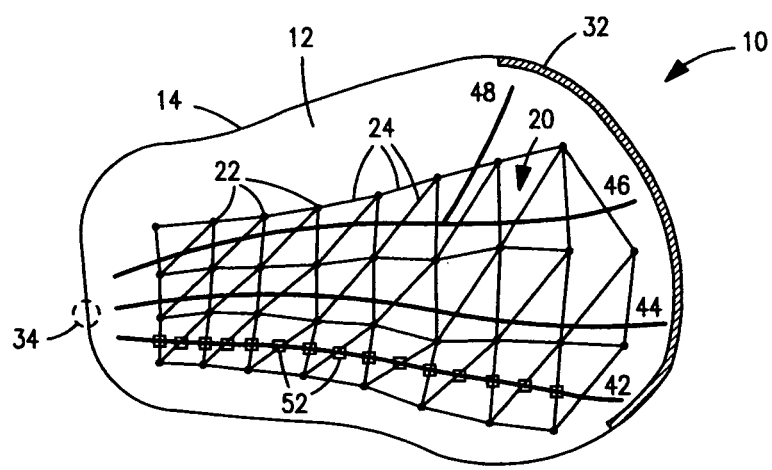
FIG. 2a illustrates an area of interest according to the disclosure.

For example, FIG. 2a illustrates an area of interest 10 having an initial surface 12 defined by a boundary 14. The area of interest 10 includes a plurality of topographic data points 22 acquired, for example, by a GPS-equipped vehicle traversing the area 10. While the topographic data points 22 as illustrated are arranged in a semi-regular rectangular grid, the data points 22 can be arbitrarily arranged in the area 10 (e.g., resulting from a vehicle operator's particular path chosen to traverse the area 10). A plurality of lines 24 are then computed according to a triangulation algorithm to create the triangulated network 20.

To increase the accuracy and precision for calculation of earthmoving quantities and distances in subsequent balancing steps, it is preferable to have a high definition topographical map of the area of interest. An accurate topographical map should have a sufficient number of well-placed topographic data points to effectively describe the area of interest in three dimensions (i.e., x-y positional coordinates in the area of interest and the elevations associated with each coordinate). Accordingly, the data point density is preferably increased in regions of the area of interest where elevation changes are rapid and/or irregular. Conversely, the data point density can be decreased in regions where elevation changes are gradual and the surface is relatively smooth. The data point density can be adjusted in the field by a skilled operator who adjusts the path of the vehicle traversing the area of interest based on observations of the area. For example, a few, relatively widely spaced vehicle passes may be suitable to characterize smooth regions (e.g., data points spaced about 50 ft (15 m) to about 100 ft (30 m) apart), while multiple, relatively narrowly spaced passes are preferred to characterize rapidly changing regions (e.g., data points spaced about 10 ft (3 m) to about 20 ft (6 m) apart, in particular as a result of multiple passes by the operator in a region of rapid change). While the data point density can locally vary across an area of interest, an area of interest generally has an average data point density of about 100 data points/acre (250 data points/hectare), with densities ranging, for example, from about 4 points/acre (10 data points/hectare) to about 400 points/acre (1000 data points/hectare) or about 20 points/acre (50 data points/hectare) to about 200 points/acre (500 data points/hectare).

The topographic map is preferably represented by a digital model that can be graphically viewed and analyzed by the user to identify profile positions. The digital model can be viewed in several forms, for example including contours, a triangulated network, or a grid of elevation and/or slope. Triangulated networks and grids can be used digitally by a computer for comparison of the initial surface and the design surface. The graphical representation can be used for human interaction, and the digital data is used by the software to create a representation of the initial surface. In the process of placing, arranging, and shaping initial profiles, it is desirable for the operator to view the initial surface to determine the suitable placement of profiles and outlet (e.g., to ensure that the entire area of interest will drain well) using either an internal software module or a separate mapping/design program to view and locate profiles and outlets.

Initial Profiles

The topographic data (e.g., individual data points and resulting map) are then used in combination with a set of initial profile design parameters to calculate a plurality of initial profiles (e.g., using a computer or similar means for defining initial profiles) as illustrated schematically in FIG. 1a ("build profiles"). The topographic map can be used by an experienced operator to identify watersheds and drainage ways, for example based on experience/training and/or conventional software that analyzes the topographic map. The drainage ways are generally paths that excess water running off the field would follow. Since the drainage ways are generally irregular in both a horizontal and vertical sense, the operator again uses his knowledge to identify alternate, improved paths that will drain the excess water efficiently without promoting excessive erosion.

Figure 4A:
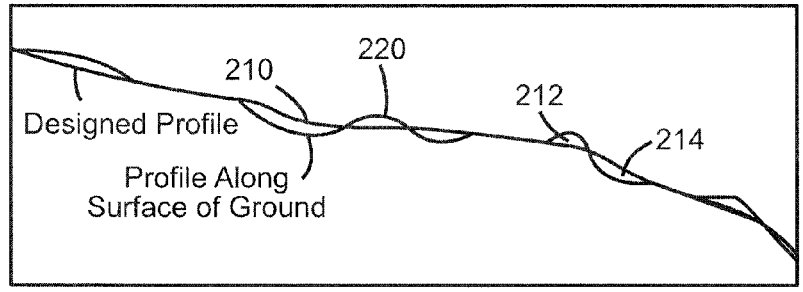
FIG. 4a illustrates a typical, vertically curved design profile, viewed from the side, as compared to the initial profile in the area of interest.
Figure 4B:
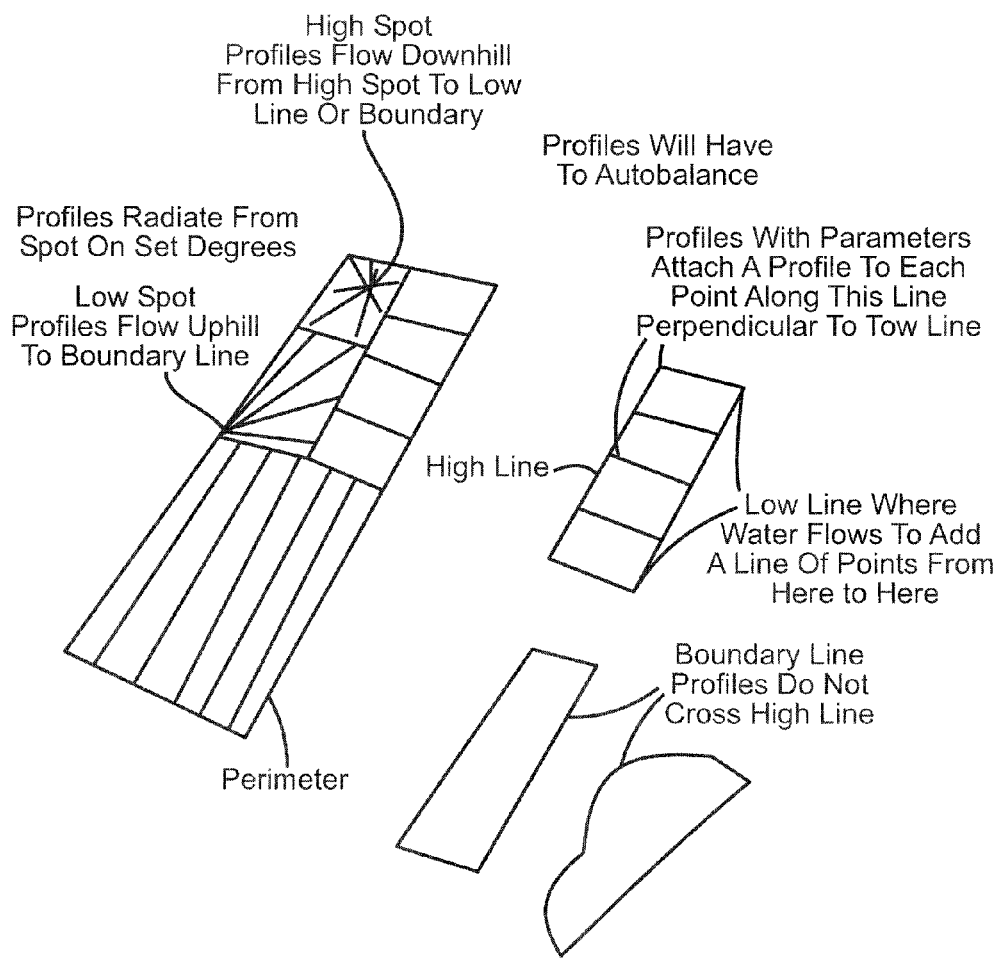
FIG. 4b illustrates how the profiles are placed within boundaries defined by high-lines.

The initial profiles according to the method are arranged consistently with the alternate paths desired for water drainage and are often based on the approximate, expected water flow patterns based on the initial, pre-existing surface. The operator generally knows where it is desirable for water to exit the field, and the topographical map shows the operator the existing watersheds and how he will be able to work with them to drain the area more effectively and cost consciously. Accordingly, the initial profiles are generally located such that they run from a higher elevation to a lower elevation (or vice versa). Different profile schemes are illustrated in FIG. 4b. For example, the initial profiles can be selected to be generally parallel and running from a high line (e.g., along a crown of a watershed) to a low line (e.g., a drain of a field). Alternatively, the initial profiles can emanate from a high point to one or more low elevations (e.g., a low line, a low point, multiple low points) or they can converge to a low point from one or more high elevations (e.g., a high line, a high point, multiple high points). Various combinations of initial profile arrangements (e.g., parallel, converging, emanating) can be combined in different regions of the area of interest. Neighboring initial profiles are generally spaced apart from each other by about 100 ft (30 m) or less along most of their length (e.g., about 20 ft (6 m) to about 100 ft (30 m), or about 50 ft (15 m)). However, the profile spacing can be lower (e.g., about 10 ft (3 m) to about 50 ft (15 m), or about 25 ft (8 m)) in areas where the initial surface changes rapidly, and the profile spacing approaches zero in cases where profiles converge/emanate from a single point.

The profiles generally do not cross paths, although profiles can converge at a point. Further, a single profile path may advantageously be broken into segments that form a compound profile. Such an arrangement can be desirable, for example, when two (or more) profiles begin at different high elevation points, but converge at a single, intermediate elevation point, and then proceed collinearly to a single low elevation point. Because the material balance is optimized along the length of a single profile, a compound profile arrangement in which a series of consecutive profile segments define a single path can be used to more finely tune the field material balance over smaller scales (i.e., more locally).

The initial profile design parameters define the position and shape of the initial profiles in the area of interest. The proposed location and outlet for each profile are specified. The design parameters generally include operator-specified values such as a beginning point, an ending point, and any desired intermediate points to define the location of each profile along with its curvature or approximate curvature. The points defining the profiles include the x-y positional coordinates in the area of interest. For example, building the initial profiles includes setting a control point by locating a starting point, locating an end point and optionally one or more intermediate points to describe a chorded polyline (i.e., a path that does not travel straight from its starting point to its endpoint). The initial profile design parameters and the topographic data are then used (e.g., by a computer) to build/calculate the plurality of initial profiles. The initial profiles are stored as a digital collection of three-dimensional data sets (i.e., x-position, y-position, and elevation (or z-position) of the initial surface for multiple points along the length of each profile) that are saved as a file for use by the autobalancing portion of the software. The initial profiles can be stored and calculated using software running on a microprocessor on a personal computer (PC) or a mobile device. The PC or other device can be in an office or alternatively on a vehicle in the field.

The three-dimensional data set for each initial profile is determined based on the shape/location of the initial profile defined by the initial profile design parameters and the topographical data. Specifically, the topographical data is used to determine the elevation of the initial surface at multiple points along the initial profile, as illustrated in FIG. 2a. For example, the area of interest 10 includes a high line 32 (e.g., a watershed crown) of elevation $h_1$ and a low point 34 (e.g., an outlet or drain) of elevation $h_2$, where $h_1 > h_2$. Accordingly, the operator defines a plurality of initial profiles including a first profile 42, a second profile 44, a third profile 46, and a fourth profile 48 (e.g., by defining start, end, and intermediate locations as above). As illustrated, the third and fourth profiles 46 and 48 converge at a midpoint along the length of the third profile 46 and then travel together to the low point 34 (i.e., the third profile 46 is a compound profile). Individual elevation data points along the length of the initial profiles are determined based on the intersection of the profiles with the topographical map. For example, the first initial profile 42 is characterized by a plurality points 52 determined defined by the intersection of the first profile 42 with the lines 24 of the triangulated network 20, as illustrated in both FIGS. 2a and 2b.

Design Profiles

The initial profiles are then used in combination with a set of balancing design parameters to calculate a plurality of design profiles (e.g., using a program for a computer or similar means for means for optimizing the balance of surface cut volume and fill volume) that individually minimize the soil/material balance so that the plurality of design profiles (and preferably each design profile) is substantially at balance, as schematically illustrated in FIG. 1a. The design profiles are generally provided to assure that water will be able to flow off of the area of interest described by a group of design profiles. The design profiles preferably control the flow of water so that water both (1) does not to remain on the field for a long period of time and (2) does not move quickly enough to erode the surface. Minimum and maximum slopes of certain soils and other materials are known to meet the above criteria. It is also desirable to identify design profiles that minimize the amount of earth or other material that is moved to achieve the desired slopes while also maintaining the soil/material balance.

As schematically illustrated in FIG. 1b, the balancing design parameters can include profile slope (e.g., minimum, maximum, and optimal), profile depth (e.g., maximum, and optimal), profile elevation (beginning, ending, intermediate), profile curvature or rules of curvature (e.g., maximum), earth balancing or rules of earth balancing (e.g., maximum), and/or material shrink/swell. Other balancing design parameters also can be specified to additionally constrain the system so that the resulting design profiles have desirable properties. For instance, a maximum haul distance can be specified to limit the distance over which cut and fill volumes are redistributed over the area of interest. The design parameters generally provide multiple degrees of freedom for the balancing routine, thus allowing minimization of the material balance while ensuring that suitable parameter boundaries are not exceeded. While any collection of the balancing design parameters are usable in practice, suitable design profiles can be generated by parametrically varying the minimum profile slope, the maximum profile depth, and the optimal profile depth to achieve a desired earth balancing limit. In an embodiment, the balancing design parameters can be specified on a profile-by-profile basis (i.e., each design profile can be the result of a unique set of balancing design parameters). The design knowledge for the area of interest can be considered when generating the design. Other previously existing surface or sub-surface features such as pipes, ditches, or other constructions also can be considered. For example, any past or proposed tiling or ditching drainage system designed using a vertically curved profile for its design can be included into the surface design. The surface design would use the integration of the data used to design these structures to further lessen the earthwork and compaction involved in the land shaping procedure. Also, a design to be constructed on a site in the area of interest, after the surface is complete, can be considered when designing.

The profile slope is generally selected to promote surface water flow at the minimum parameter, thereby preventing the accumulation of stagnant water in the area of interest. Conversely, the maximum parameter is generally selected to inhibit surface erosion, as water flowing down steep grades can rapidly alter and erode the design surface. Thus, a preferred slope parameter will balance these two competing considerations and optimizes the residence time of water flowing in the area of interest. The profile slope also can be selected to ensure that water from a certain area does not move to another area to create standing water. To alleviate such an issue, the profile slopes are preferably selected such that water from along the entire length of a resulting design profile moves along the design surface to a proper outlet. Factors affecting the specification of suitable slopes include, for example, the type of soil (or other earth material to be redistributed), the size and porosity of soil/earth material particles, and the size of the watershed in the area of interest. Suitable minimum slopes are about 0.01% (rise/run) or about 0.03%, suitable maximum slopes are about 1.5% or about 2%. Suitable optimum slopes are about 0.05%, for example ranging from about 0.03% to about 0.07%. For example, when the minimum profile slope is used as an optimization parameter, the autobalancing routine parametrically varies the minimum slope (which applies at every point along the profile) between about 0.01% and about 2%, with most candidates distributed near an optimal slope of about 0.03% to about 0.07%. Thus, any candidate profile will locally have a slope of at least the minimum slope for the candidate, but the actual local slope may be higher than the minimum based on other balancing design parameters (e.g., maximum, optimum depth).

The profile depth generally represents the maximum allowable cut depth for the area of interest. For example, the maximum profile depth is generally about half or less of the thickness of topsoil in the area of interest. Alternatively or additionally, the maximum profile depth may be limited by the ability of the earthmoving machinery to penetrate a certain distance. A suitable optimum profile depth is generally about half of the maximum depth. Accordingly, for common thicknesses of topsoil, the maximum profile depth preferably ranges from about 2 in (5 cm) to about 4 in (10 cm), while the optimum ranges from about 1 in (2.5 cm) to about 2 in (5 cm).

The profile elevation represents the specification of absolute elevations along the length of the design profile. Generally, a terminal point (i.e., a beginning or ending point) profile elevation is specified. However, the elevation of other points along the profile also can be specified (e.g., intermediate points, a second terminal point). Often, the ending profile elevation of multiple profiles can be set to the same low value, thus establishing a fixed low line towards which water in the area of interest will flow.

The profile curvature (or the rules of curvature) limits the rate at which the profile slope can spatially change (i.e., a limit on the first spatial derivative of the profile slope, or a limit on the second spatial derivative of the profile elevation). Preferably, the profile slope changes gradually such that the profile curvature is small. In any case, the profile curvature should prevent abrupt changes in slope along a profile. A maximum profile curvature of about 0.5% (or about 0.1%) is suitable limit on the absolute change in slope between adjacent points along a profile.

The earth balancing parameter (or the rules of earth balancing) establishes an upper limit on the extent to which the cut volumes and fill volumes can be imbalanced. The limit applies to the area of interest as a whole, but also is preferably applied to the design profiles individually to improve both the local and the global material balance. Preferably, the earth balancing parameter is selected such that the plurality of design profiles is substantially at balance, thus reducing or eliminating the need to import or export excess soil from the area of interest to create the design surface. For example, an earth balancing limit may be specified by operator experience, but it is preferably less than about 0.1 (although limits of less than about 0.05, 0.02, or 0.01 are attainable with the disclosed method), where the earth balancing limit ($\Delta B$) is defined by the following:

$$\Delta B \equiv \left| \frac{V_{cut}}{V_{fill}} - 1 \right|, \tag{I}$$

where $V_{cut}$ is the total cut volume (across the entire area of interest and/or across a single profile) and $V_{fill}$ is the total cut volume (across the entire area of interest and/or across a single profile).

A desired design surface not only meets the earth material balance limit, but preferably also does so by minimizing the amount of material redistributed to meet the material balance, which minimization correspondingly reduces the time and cost of performing the surface modification. Accordingly, the earth balancing parameter also can establish an upper limit on the net volume of material that must be redistributed between cut and fill volumes. Preferably, the limit on material redistribution is about 15 ft or less or about 10 ft or less, more preferably about 1 ft or less or about 0.4 ft or less, where 1 ft of redistributed material is equivalent to about 1750 yd³ redistributed material/acre of surface (i.e., 1 ft is 1 ft³ of material per ft² of surface (or 1 ft² of material per linear profile ft) or 0.3 m³ of material per m² of surface (or 0.3 m² of material per linear profile m)). The material redistribution limit can be applied to either or both the cut and fill volumes (or areas, when applied two-dimensionally along a profile), which are substantially equal in general based on the earth balance. Similar to the earth balance, the limit on material redistribution can be applied to globally, locally (i.e., per profile), or both.

The material shrink/swell parameter accounts for the tendency of certain materials to change their bulk density as they are redistributed by earthmoving operations. For example, some materials are loosened by excavation (i.e., by cutting) or compacted in the placement operation (i.e., in the filling operation). Often, various soils and clays are compacted upon filling and require a cut volume that is larger than the expected fill for a given design surface, for example requiring a cut volume that is about 10%, about 20%, or about 30% larger than the desired fill volume (i.e., the term $V_{fill}$ in Equation (I) includes an additional factor of about 1.1, about 1.2, or about 1.3 to achieve an earth balance within the specified limit). Conversely, other earth materials such as sand exhibit essentially no shrink or swell, and the desired cut volume is equal to the fill volume. The shrink/swell parameter varies according to the type of earth material being moved, and can be suitably determined based on operator experience and/or field tests for the particular earth material.

Figure 2B:
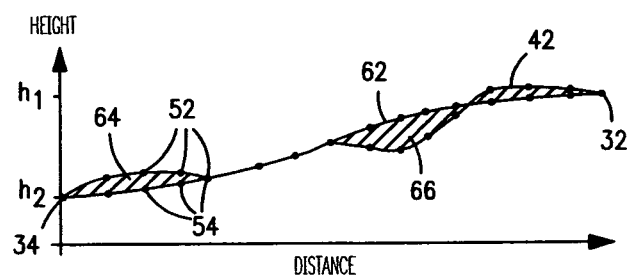

Once the initial profiles are designed, it is advantageous to balance the soil volume for cut and fill along the length of the profiles. Earth should be moved the shortest distance possible to still effect grade changes without exporting earth from or importing earth to the area of interest. Balancing is computed based on the areas above (corresponding to the cut volumes) and below (corresponding to the fill volumes) a proposed design profile and bounded by the initial profile, for example as illustrated in FIGS. 2b and 4a. In the final design profile, the cut and fill volumes should be nearly equal, or equal based on the material shrink/swell parameter. In an embodiment, the cut and fill volumes are balanced according to the corresponding cut and fill areas defined by the initial and design profiles (i.e., as shown in FIGS. 2b and 4a). In this embodiment, the dimension of the cut and fill volumes in the direction normal to the cut and fill area surfaces is assumed to be approximately constant (which assumption is often sufficiently accurate when adjacent profiles are substantially or even roughly parallel). However, in a further embodiment, the cut and fill volumes are balanced according to cut and fill areas that are weighted based on the distance between adjacent profiles at a given location. For example, in FIG. 2a, cut and fill areas along the second profile 44 are weighted more heavily near the high line 32 (i.e., where neighboring profiles are spaced farther apart) and are weighted less near the low point 34 (i.e., where neighboring profiles begin to converge). The final design profiles are digitally stored to generate the entire design surface of the area of interest.

Autobalancing is a computational routine in the disclosed method that identifies design profiles that substantially balance earthwork cut and fill volumes, taking into account any material shrink/swell. To perform the autobalancing routine, the initial profiles and the set of balancing design parameters are provided to the means for optimizing the balance of surface cut volume and fill volume, as schematically illustrated in FIG. 1a. An example of the means for optimizing includes a genetic algorithm program running on a microprocessor of a PC or mobile device. The means for optimizing automatically balances the initial profiles to generate the design profiles. Computational limits (e.g., maximum number of generations and/or maximum computational time) can be applied to the genetic algorithm, which repeats for one or more generations. For example, the genetic algorithm preferably performs 10 or fewer generations with a computational time of about 1 minute/generation or less. To balance the design profiles, the genetic algorithm takes information from candidate profiles in a current generation and, as a group, uses that information to create new candidate design profiles that come closer to a desired, balanced outcome. The genetic algorithm computation begins with a plurality of candidate profiles (e.g., about 10 to 20) that are characterized by an arbitrarily assigned (e.g., randomly assigned or manually selected) collection of the various balancing design parameters (e.g., minimum slope, optimum depth, maximum depth). The genetic algorithm evaluates each candidate profile according to any applied fitness functions (e.g., the earth balancing parameter applied to the material balance and/or the material redistribution limit). The genetic algorithm repeats to generate the design profiles until the maximum number of generations (i.e., iterations) has been completed and/or the earth balancing limit has been reached. It is important that a sufficient number of design profiles are stored to properly describe the desired surface so that design lines between points do not cross existing surfaces go as to create an imbalance or an unworkable design. In some embodiments, the genetic algorithm is composed in Prolog logic programming language. One or more final generations are then generated, and the accepted outcomes for the design profiles are used to produce data points for the final design surface, which data points are saved to a file.

The balancing process is illustrated in more detail in FIG. 2b. A proposed design profile 62 is illustrated relative to the first profile 42. The design profile 62 is defined by a plurality of points 54 that corresponds to the plurality of points 52, where each point 54 is translated in the z-direction (i.e., elevation coordinate) relative to the corresponding point 52, but otherwise shares the x-y positional coordinates with the corresponding point 52. The resulting design profile 62 relative to the first profile 42 thus defines one or more cut volumes 64 and one or more fill volumes 66, where the cut volumes 64 represent areas where material is to moved from the initial surface 12 and the fill volumes 66 represent the destination areas of the cut material. When the design profile 62 is substantially balanced, the sum of the cut volumes 64 and the sum of the fill volumes 66 are substantially equal (taking into account any material shrink/swell). The autobalancing routine iteratively adjusts the plurality of points 54 (i.e., within the limits established by the set of balancing design parameters) until the design profile 62 is substantially balanced and/or the maximum number of computational generations is achieved.

Design Surface

Once a balanced plurality of design profiles is obtained from the autobalancing routine, a design surface is generated from the plurality of design profiles. Typically, the design profiles are curved vertically (i.e., they exhibit gradual, sloped changes in elevation as a result of the autobalancing and design parameters). The final design surfaces promote water drainage from the area of interest, while also having cut volumes and fill volumes of the soil that are at or near balance as much as possible from the available volume and fill. The initial and autobalancing design data can be used to direct one or more earth-moving machines that create the design surface in the area of interest (i.e., by grading areas along and between the design profiles). The design algorithm and the genetic algorithm can be, for example, composed in Prolog logic programming language for the microprocessor. However, it is to be understood that any programming language known in the art can be used.

Once all of the shaping criteria are fulfilled and balanced design profiles are obtained, the design profiles are used to build the design surface. The design surface describes the intended final shape/contours of the area of interest after the earthwork is completed. The design surface should follow the design parameters in all parts of the area of interest, for example providing a smooth elevational transition between individual field areas. The surface should be mathematically defined to provide a design elevation at any x-y positional location. In an embodiment, elevational and positional data points defining the design profiles can be used to generate a triangulated network of the design surface. For example, the points 54 defining the design profile 62 that originally corresponded to the points 52 defining the first profile 42 (i.e., as illustrated in FIGS. 2a and 2b) can be used with the points corresponding to the other design profiles (not shown) to define the design surface with a second triangulated network (not shown). Thus, both the initial and design surfaces are defined at every point in the area of interest 10, and, accordingly, the elevation difference between the initial and design surfaces can be determined at any location, which elevation difference guides the subsequent earthmoving process.

The design surface definition is preferably in a digital format readable by a machine-control computer to control the cutting edge of an earthmoving and grading machine. The elevational differences between the initial and design surfaces are normally so slight that they are not easily discernible to the operator's eye. It is also difficult to manually control the machine to the tolerances needed over a day's work. Accordingly, it is preferable to use computer control of the machine, for example by controlling the hydraulic system of the machine. The control of the machine can use the same computer that is used for the collection of topographic data and the calculation of initial and design surfaces and profiles. The computer processes positional information from the previously mentioned methods.

Interactive Process

The foregoing process steps (e.g., acquisition of the topographic data, construction of the initial surface and profiles, the autobalancing calculation of the design surface and profiles) can be generally performed serially. However, sometimes it is preferable to repeat at least some of the above steps to create the best representation of the initial surface and/or the design surface. The initial profile building steps and the autobalancing steps can be repeated as many times as necessary to achieve an acceptable design and balance.

For example, after a review of the initial or design surface, it can be helpful to add, remove, or revise the profiles that control the points at which the triangles in a triangulated network defining the surfaces are constructed. Two methods of this operation are provided: (1) in an office setting, the system operator can do the operations described above by using the computer and software to edit the profiles; and (2) while in the field, the system operator can add new profiles or replace existing profiles based on data collected as the operator traverses the area of interest (e.g., by driving along the path of the profile to be added or replaced). In some cases, it could be advantageous to design the profiles and surfaces either partially or completely in the field using the above method. Since the topographic map often misses a relevant surface feature (e.g., a small depression or a rise) that could impede proper design, the operator can locally increase the density of topographic data and profiles in regions of the area of interest where the missed surface features are located. Thus, it can be that field design can substantially supplement and improve a design performed exclusively in an office setting. In some cases, the entire surface design can be performed in the field.

In the basic process described above, the autobalanced solution for each design profile is independent from the solutions of neighboring profiles (i.e., the solution for a particular design profile does not affect the solution for any other design profiles in the area of interest). In a further embodiment of the disclosed method, however, it may be desirable to perform a multiple-step optimization process that creates an interdependence between neighboring profiles and that generates a final design surface that is smoother than what would otherwise be obtained with the basic process.

Figure 2C:
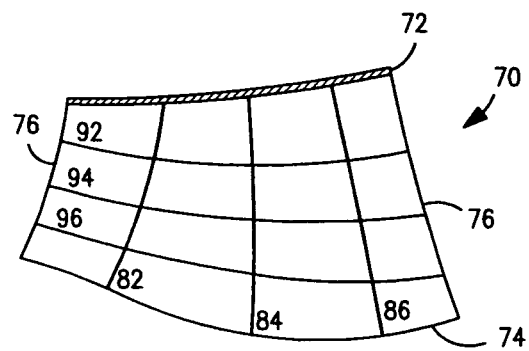
FIG. 2c illustrates an area of interest according to an additional embodiment of the disclosure using a multiple-step balancing process.

For example, FIG. 2c illustrates an area of interest 70 having an initial surface, a high-line 72, a low-line 74, and boundaries 76. In consideration of the general guidelines for profile placement described above, flow profiles 82, 84, 86 illustrate suitable profiles along the lengths of expected and desired of water flow paths based on the underlying surface (i.e., the "flow direction"). The flow profiles 82, 84, 86 could be combined with topographic data for the initial surface to sequentially generate initial profiles, design profiles, and a design surface according to the basic process. However, it may be the case that surface irregularities in the initial surface that are generally perpendicular to the flow profiles 82, 84, 86 (i.e., the "cross direction") could disrupt water flow in the intended flow direction. In this case, it can be desirable to additionally smooth/balance the surface irregularities in the cross direction by defining cross profiles 92, 94, 96. The cross profiles 92, 94, 96 are used to compute an intermediate surface from the initial surface in the same manner as described above (i.e., intermediate profiles optimizing the earth balance along their length are computed relative to the initial surface along the length of the cross profiles 92, 94, 96). Then, the intermediate surface is used as an initial condition for optimizing the earth balance along the length of the flow profiles 82, 84, 86 to generate design profiles and the corresponding design surface.

The multiple-step optimization/smoothing process can be performed in any order, for example by first optimizing in the cross direction and then in the flow direction (i.e., as described with reference to FIG. 2c), or vice versa. Additionally, the multi-step process can be performed multiple times in series to increase the level of smoothing and spatial interdependence, for example by optimizing in the cross direction, then in the flow direction, then in the cross direction a second time, then in the flow direction as second time, etc. Further, while the multi-step process is preferably performed with profiles running in two substantially orthogonal directions (e.g., the flow and cross directions), the multi-step process can be performed using additional directions and/or non-orthogonal directions.

In contrast to the flow profiles 82, 84, 86, the cross profiles 92, 94, 96 can be selected to roughly follow desired contours of approximately constant elevation to minimize the cross-flow of surface water and promote the flow of the surface water in the flow direction. In such case, the set of balancing design parameters applied to the profiles in the cross direction are preferably different from those applied to the profiles in the flow direction. For example, the minimum and optimum slopes are preferably about 0% (i.e., to maintain a flat surface), the maximum slope is preferably about 1.5% or about 2%, while other parameters (e.g., depth) can be similar to those for the flow direction. Alternatively, the slope parameters can be selected to establish a higher elevation along the flow profile 84 relative to the flow profiles 82 and 86, thereby inducing surface water to flow outwardly towards the boundaries 76 as well as towards the low-line 74. In an embodiment, the cross profiles 92, 94, 96 can be manually located according to these principles and the operator's general knowledge. In an alternate embodiment, the placement of the cross profiles 92, 94, 96 can be automated, for example by distributing (e.g., evenly) the cross profiles 92, 94, 96 along the length of the flow profiles 82, 84, 86 such that the cross profiles 92, 94, 96 traverse the flow profiles 82, 84, 86 at consistent intervals and at substantially perpendicular angles.

Machine Control

A machine control program in the earthmoving/grading vehicle preferably contains several modules that are specific to the procedures for completing the design surface. A first surface description module uses a triangulated network or gridded network to digitally describe the design surface. The data saved from the autobalancing operation is directly used by the first module to create the surface. A second communication module communicates with and controls a spatial/elevation measuring instrument. Generally this instrument is a GPS, but also can be a robotic total station, a laser/GPS combination, or any other method of accurately measuring the current position. A third graphics module illustrates the operator's position in relation to the design surface. The operator can view the position on a map, a triangulated network, a gridded network, or a combination of all three. During the cut/fill process, the operator can also view maps showing areas that still need to be cut, still need to be filled, or that are currently at/near the design surface. The operator is able to perform many other survey and reporting functions while in this guidance mode, which is preferably used until the instantaneous surface is at/near its design surface. A fourth machine control module allows the computer program to perform elevation- and slope-controlling functions of the grading or earthmoving machine. Solenoid valves controlled by the computer are used to direct the hydraulic functions of such equipment to form the designed surface.

Examples

Figure 3A:
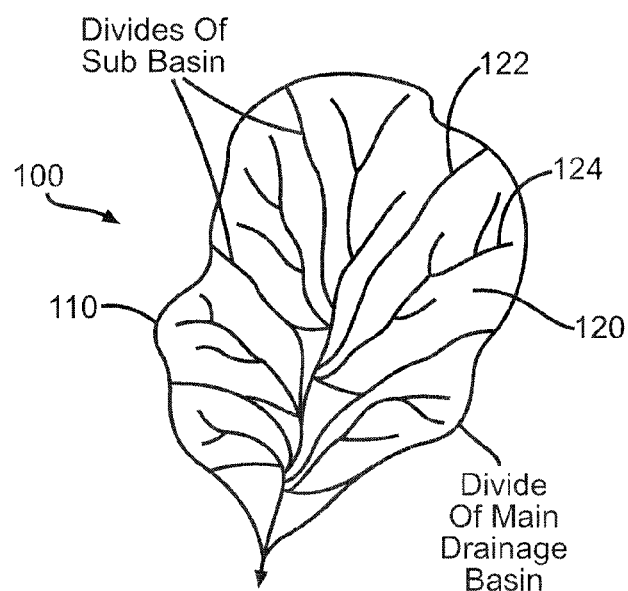
FIG. 3a illustrates a typical main drainage basin divided up into sub-basins.
Figure 3B:
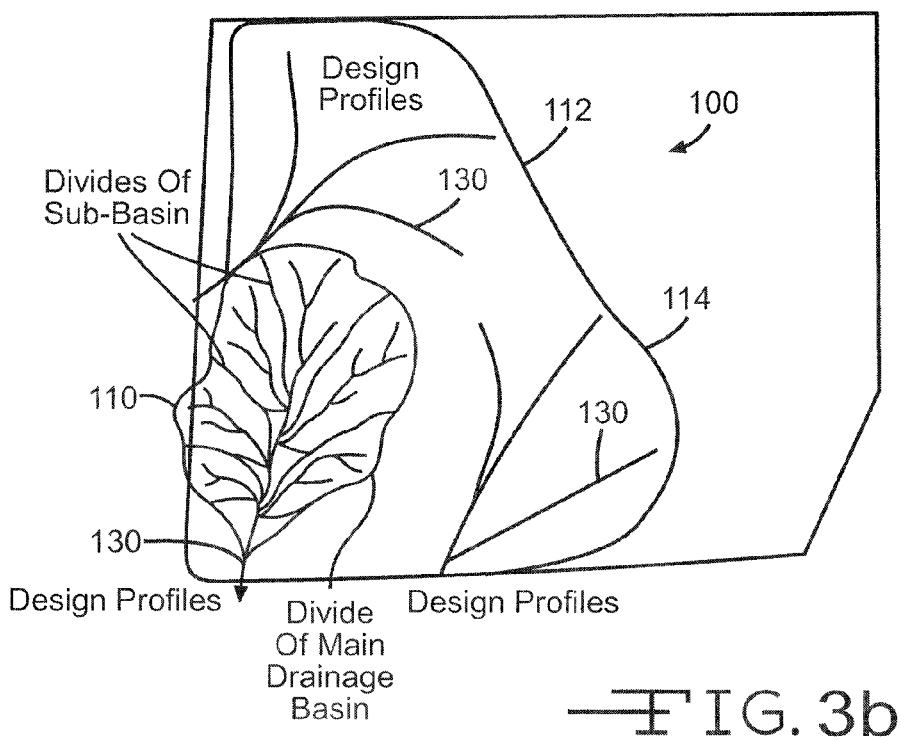
FIG. 3b illustrates the drainage basin of FIG. 3b, in conjunction with other basins in the area of interest, illustrating a number of design profiles.
Figure 3C:
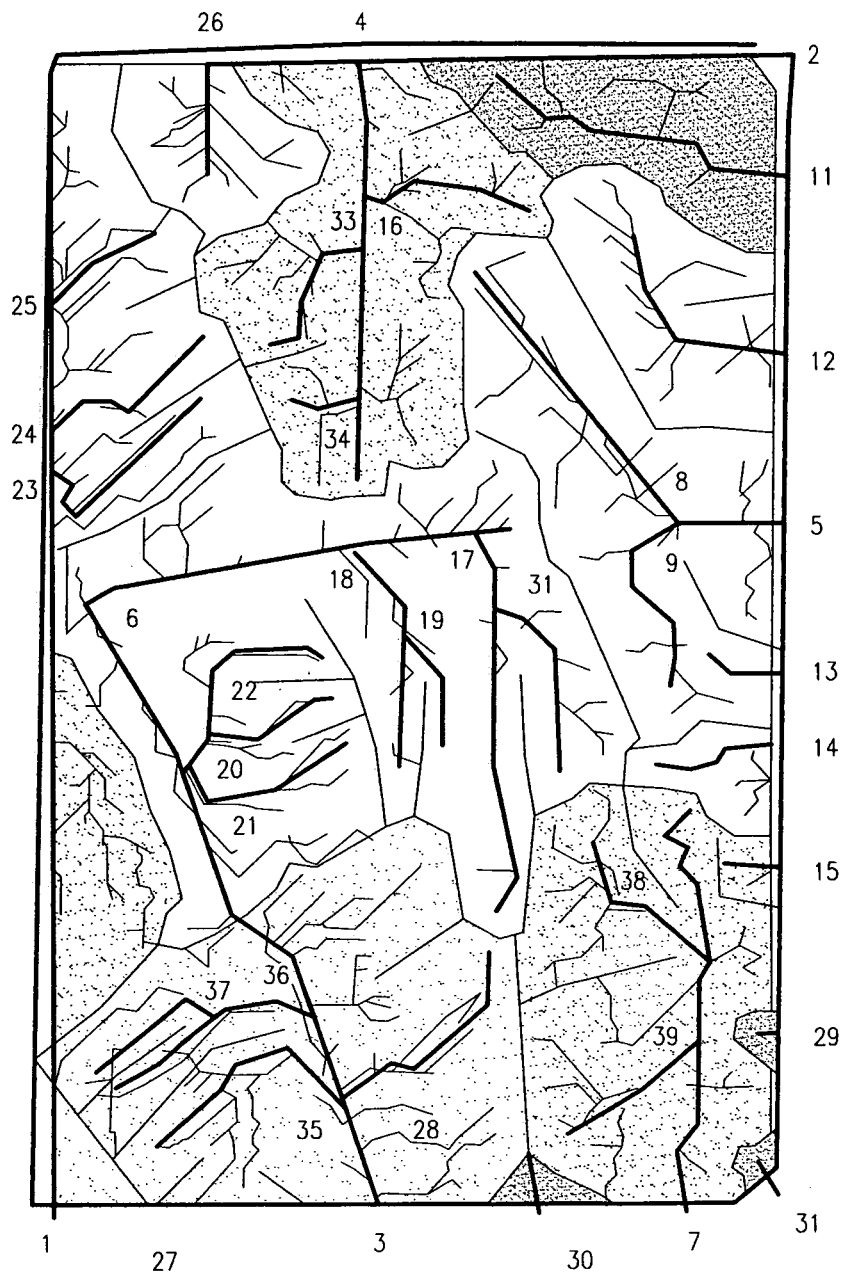
FIG. 3c illustrates a typical area of interest with a number of design profiles generated in various basins.

FIGS. 3a and 3b illustrate a typical watershed or drainage basin 110 in a hypothetical area of interest 100. In FIG. 3a, the drainage basin 110 is divided up into a plurality of sub-basins 120, each of which are defined by one or more high lines 122 and contain one or more natural water paths 124. Based on the topographic data of the initial surface of the main drainage basin 110, profiles 130 shown in FIG. 3b illustrate how an operator might elect to represent the drainage basin 110 according to the present method. FIG. 3b further illustrates how the drainage basin 110 can represent only a portion of the area of interest 100, which also can include additional drainage basins 112 and 114 also having separately modeled design profiles 130. FIG. 3c similarly illustrates a typical, complex area of interest with a number of design profiles (numbered, solid black line segments) generated in various basins (the boundaries and high-lines of which are shown in solid grey line segments). The underlying topographic data can be suitably analyzed (e.g., to generate a topographic map and identify naturally existing paths of water drainage) with commercially available software such as AGDATA VIEWER (available from GK Technology, Halstad, Minn.).

FIG. 4a illustrates a typical design profile 210 as compared to an initial profile 220 from a hypothetical area of interest. As shown, cut volumes 212 are approximately balanced with the fill volumes 214. FIG. 4b illustrates how the profiles can be suitably placed within boundaries defined by high-lines. High-lines as include boundaries of watersheds, whereas low-lines include areas of water outlet. The profiles preferably do not cross the high-lines. As shown, the profiles can radiate from a high spot down a hill to a low-line or boundary, or the profiles can radiate uphill from a low spot to a high-line or boundary. Also, as seen on the right side of the figure, profiles can run perpendicular to a low-line from a high-line.

An operator preferably uses software to perform many of the steps of the disclosed method. Common software tasks include: (a) viewing a topographic map of an area of interest; (b) deciding where watersheds are located and how the water will best flow out of the watershed; (c) defining a plurality of profiles (lines and/or curved lines) along which water will flow smoothly; (d) ordering the software to autobalance and identify a best-fit solution to balance cut and fill volumes along the profiles using a set of design parameters (e.g., slope, cut depth, and vertical curvature); and (e) viewing the profiles of the initial surface and the designed surface. The operator ensures that water from each watershed has an outlet to a ditch, stream, or river so as not to create ponded water on the watershed. The operator also ensures that the watershed is drained properly within itself.

Figure 5:
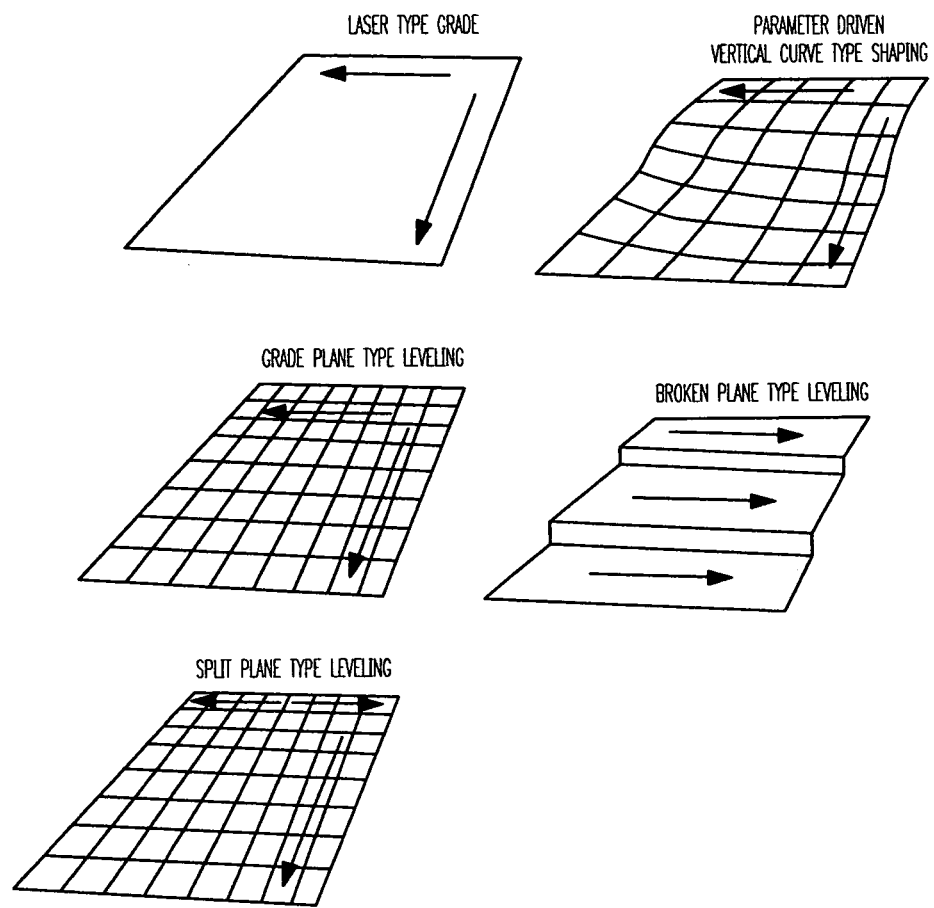
FIG. 5 illustrates three-dimensional representations of various shaping methods.
Figure 6:
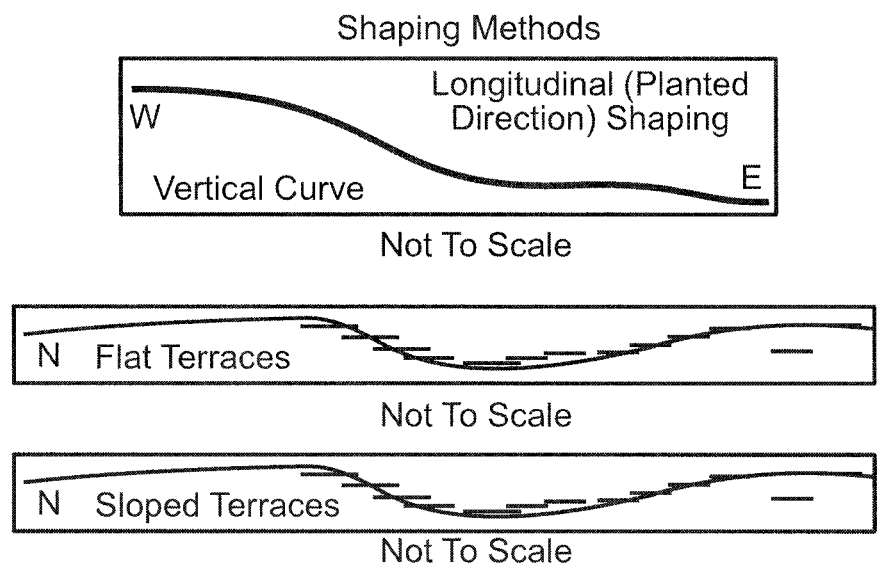
FIG. 6 illustrates a number of shaping methods, such as flat and sloped terraces.

Currently, there are several ways of designing watersheds. The most popular of these is a graded planar surface as illustrated in FIG. 5. In this case, an operator designs a best-fit plane that will move water across it at a rate that will not cause erosion or move too slowly. This design can be implemented fairly quickly, but generally causes more earth to be moved and more soil compaction resulting from increased equipment travel across the field. The second is a multiplane method as illustrated in FIG. 6, which can create flat terrace surfaces that interconnect. However, the method can be very tedious to use and also creates a stair-step effect (i.e., a steep inter-terrace transition) that can cause erosion at each intersection.

Figure 7:
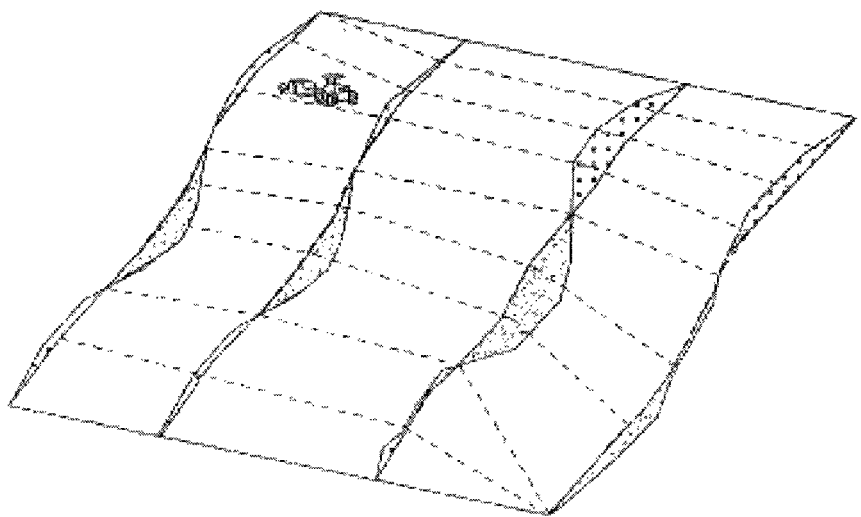
FIG. 7 illustrates how a typical area of interest is modified from the initial surface to the final design surface.

As best seen in FIG. 7, the disclosed profile-design method described herein generates a smoother final design surface from an initial surface. Areas of cut are designated by hashed grey regions, while areas of fill are designated by dark grey regions. The disclosed method has several advantages, such as: (a) the automatic use of the pre-existing contours of an area of interest guides the determination of a design surface that best corresponds to the initial surface, thereby minimizing earthwork and compaction; (b) the use of profiles simplifies work with irregularly shaped watersheds; and (c) drainage can be designed in many directions to best fit the initial surface of the area of interest.

The disclosed method can be used to generate a design surface. The method uses unique curved profiles to design drainage solutions. Users set preferred design parameters required for their specific drainage project, and software optimizes a drainage solution that uses a finite number of grade breaks through the drainage path. The method allows drainage paths to retain nutrient rich soils, yet move the minimal amount of soil to provide desired drainage. In the case of a tile plow application, the software allows tile to be placed at optimum depth in variable terrain. This saves considerable time relative to conventional laser systems that require a point-to-point drainage path or manual grade breaks. The method allows a drainage path to be designed without regard to axis alignment as laser systems require.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure. Therefore, the disclosure is limited only by the claims attached hereto.

Accordingly, the foregoing description is given for clearness of understanding only, and no unnecessary limitations should be understood therefrom, as modifications within the scope of the disclosure may be apparent to those having ordinary skill in the art.

Throughout the specification, where the compositions, processes, or apparatus are described as including components, steps, or materials, it is contemplated that the compositions, processes, or apparatus can also comprise, consist essentially of, or consist of, any combination of the recited components or materials, unless described otherwise. Combinations of components are contemplated to include homogeneous and/or heterogeneous mixtures, as would be understood by a person of ordinary skill in the art in view of the foregoing disclosure.

What is claimed is:

1. A method of generating a design surface that promotes water drainage from soil in an area of interest, the method comprising:
    (a) acquiring topographic data for an initial surface in an area of interest;
    (b) providing the topographic data and a set of initial profile design parameters to a means for defining initial profiles;

(c) calculating a plurality of initial profiles adhering to the initial profile design parameters;
(d) providing the plurality of initial profiles and a set of balancing design parameters to a means for optimizing a cut/fill volume balance;
(e) generating a plurality of design profiles with the means for optimizing a cut/fill volume balance, wherein the plurality of design profiles is substantially at balance and the cut/fill volume balance is optimized using a multiple-step process that creates an interdependence between neighboring profiles; and,
(f) generating a design surface from the plurality of design profiles.

2. A method of generating a design surface that promotes water drainage from soil in an area of interest, the method comprising:
(a) acquiring topographic data for an initial surface in an area of interest;
(b) providing the topographic data and a set of initial profile design parameters to a means for defining initial profiles;
(c) calculating a plurality of initial profiles adhering to the initial profile design parameters;
(d) providing the plurality of initial profiles and a set of balancing design parameters to a means for optimizing a cut/fill volume balance;
(e) generating a plurality of design profiles with the means for optimizing a cut/fill volume balance, wherein the plurality of design profiles is substantially at balance; and,
(f) generating a design surface from the plurality of design profiles
wherein:
the plurality of initial profiles comprises a plurality of first initial profiles and a plurality of second initial profiles, the second initial profiles being generally oriented in a direction different from that of the first initial profiles and intersecting the first initial profiles; and
step (e) further comprises:
(e-1) generating a plurality of intermediate profiles with the means for optimizing a cut/fill volume balance along the length of the first initial profiles, wherein the plurality of intermediate profiles is substantially at balance;
(e-2) generating an intermediate surface from the plurality of intermediate profiles; and,
(e-3) generating the plurality of design profiles relative to the intermediate surface with the means for optimizing a cut/fill volume balance along the length of the second initial profiles, wherein the plurality of design profiles is substantially at balance.

3. The method of claim 2, further comprising representing the initial surface and the design surface with a triangulated network.

4. The method of claim 2, further comprising the step of:
(g) directing one or more earth-moving machines to create the design surface in the area of interest.

5. The method of claim 2, wherein the means for defining initial profiles comprises a microprocessor.

6. The method of claim 2, wherein the set of balancing design parameters comprise one or more of a minimum profile slope, a maximum profile slope, an optimal profile slope, a maximum profile depth, an optimal profile depth, a starting profile elevation, an ending profile elevation, a profile curvature limit, and an earth balancing limit.

7. The method of claim 2, wherein the set of balancing design parameters comprise a minimum profile slope, a maximum profile depth, and an optimal profile depth.

8. The method of claim 2, wherein the set of balancing design parameters comprise an earth balancing limit of about 0.1 or less, as applied to each design profile.

9. The method of claim 2, wherein the design profiles are curved vertically.

10. The method of claim 2, comprising performing at least one of steps (a)-(f) in the area of interest.

11. The method of claim 10, wherein the initial profiles comprise tiling data or ditching data.

12. The method of claim 2, further comprising, before step (c), a step of providing a previously existing design to the means for defining initial profiles.

13. The method of claim 2, wherein the first initial profiles and the second initial profiles are substantially perpendicular at their intersection.

14. A method of generating a design surface that promotes water drainage from soil in an area of interest, the method comprising:
(a) acquiring topographic data for an initial surface in an area of interest;
(b) calculating a plurality of initial profiles based on the topographic data and a set of initial profile design parameters, wherein the plurality of initial profiles comprises a plurality of first initial profiles and a plurality of second initial profiles, the second initial profiles being generally oriented in a direction different from that of the first initial profiles and intersecting the first initial profiles;
(c) generating a plurality of design profiles from the plurality of initial profiles and a set of balancing design parameters by optimizing a cut/fill volume balance, wherein the plurality of design profiles is substantially at balance;
(d) generating a design surface from the plurality of design profiles; and,
(e) directing one or more earth-moving machines to create the design surface in the area of interest.

15. The method of claim 14, wherein the set of balancing design parameters comprise one or more of a minimum profile slope, a maximum profile slope, an optimal profile slope, a maximum profile depth, an optimal profile depth, a starting profile elevation, an ending profile elevation, a profile curvature limit, and an earth balancing limit.

16. The method of claim 14, wherein the set of balancing design parameters comprise an earth balancing limit of about 0.1 or less, as applied to each design profile.

17. The method of claim 14, wherein the design profiles are curved vertically.

18. The method of claim 14, comprising performing at least one of steps (a)-(d) in the area of interest.

19. A method of generating a design surface that promotes water drainage from soil in an area of interest, the method comprising:
(a) acquiring topographic data for an initial surface in an area of interest;
(b) providing the topographic data and a set of initial profile design parameters to a means for defining initial profiles;
(c) calculating a plurality of initial profiles adhering to the initial profile design parameters;
(d) providing the plurality of initial profiles and a set of balancing design parameters to a means for optimizing a cut/fill volume balance;

(e) generating a plurality of design profiles with the means for optimizing a cut/fill volume balance, wherein the plurality of design profiles is substantially at balance; and, (f) generating a design surface from the plurality of design profiles wherein:

the plurality of initial profiles comprises a plurality of first initial profiles and a plurality of second initial profiles, the second initial profiles being generally oriented in a direction different from that of the first initial profiles and intersecting the first initial profiles; and, step (c) further comprises:

(c-1) generating a plurality of intermediate profiles by optimizing a cut/fill volume balance along the length of the first initial profiles, wherein the plurality of intermediate profiles is substantially at balance;

(c-2) generating an intermediate surface from the plurality of intermediate profiles; and, (c-3) generating the plurality of design profiles relative to the intermediate surface by optimizing a cut/fill volume balance along the length of the second initial profiles, wherein the plurality of design profiles is substantially at balance.

* * * * *